DIGITAL TAPE TRANSPORT SYSTEM

Filed April 5, 1963 3 Sheets-Sheet 1

INVENTORS
ROBERT A. KLEIST
HAROLD A. KURTH
ROBERT L. THORNE

Robert G. Clay
ATTORNEY

DIGITAL TAPE TRANSPORT SYSTEM

Filed April 5, 1963 3 Sheets-Sheet 2

INVENTORS
ROBERT A. KLEIST
HAROLD A. KURTH
ROBERT L. THORNE

Robert G. Clay
ATTORNEY

INVENTORS
ROBERT A. KLEIST
HAROLD A. KURTH
ROBERT L. THORNE

Robert G. Clay
ATTORNEY

United States Patent Office 3,349,373
Patented Oct. 24, 1967

1 2

3,349,373

DIGITAL TAPE TRANSPORT SYSTEM

Robert A. Kleist, Harold A. Kurth, and Robert L. Thorne, Woodland Hills, Calif., assignors to Ampex Corporation, Redwood City, Calif., a corporation of California
Filed Apr. 5, 1963, Ser. No. 270,956
16 Claims. (Cl. 340—147)

ABSTRACT OF THE DISCLOSURE

A positive actuator interlock control system for an electromechanical device and which system is subject to being further responsive to control signals indicative of actual operating states of the device, said system including means insuring that certain signal circuit relationships exist before an actuator signal is applied.

This invention relates to tape transport systems, and more particularly to improved actuator systems useful in intermittent and bidirectional control of tape movement.

While some tape transport systems operate essentially continuously and at relatively low speeds, certain high performance systems used with digital data processors must now operate in a number of modes. These tape transports, usually but not necessarily used with magnetic tape, are required to operate bidirectionally and intermittently as determined by the needs of the data processor. Accordingly, the tape may have to be run full speed in one direction, stopped and immediately run full speed in the other direction.

In order to minimize the time required for tape starting and stopping, so that less time is lost during these mode changes, high performance drive systems have been developed and are now in wide use. Usually, these systems employ a pair of oppositely rotating drive capstans, each on a different side of the transducer assembly along the tape path. The tape is then driven in a selected direction merely by engagement of an associated pinch roller, which urges the tape against the selected capstan. Such mechanisms operate to bring the tape to a selected nominal velocity within milliseconds and have accordingly found wide use.

There is a danger inherent in the use of concurrently operating drive systems, however, inasmuch as if both pinch rollers are actuated at the same time the result almost invariably is a tape break. Even a momentary application of both pinch rollers can result in a catastrophic failure of the tape. Erroneous operation can result from any of a number of different causes, including simultaneous commands and accidental actuation of one pinch roller, followed by deliberate actuation of the other. Short duration noise signals, erratic relays, and like malfunctions can introduce such errors.

There therefore is a need for an interlock control for digital tape transports which function in a positive manner in response to actual operating states, and not merely in response to command signals. Such a system should function to avoid catastrophic failures due to simultaneous pinch roller actuations no matter how they may arise, whether from mechanical, electro-mechanical or noise signal causes.

It is therefore an object of the present invention to provide an improved and more reliable tape transport system.

Another object of this invention is to provide an improved digital tape transport of the type utilizing oppositely rotating drive systems and pinch rollers which might concurrently be actuated.

Yet another object of the present invention is to provide an improved pinch roller actuator interlock control for a tape transport system.

Systems in accordance with the invention meet these and other objects by providing a positive indication of actuator position, and by insuring that certain signal circuit relationships exist before an actuator signal is applied. The pinch roller actuator is constructed, in one specific example, such that its normal magnetic circuit is not essentially affected by operation of the sensing means but includes electrical switching circuits whose state depends upon the physical position of the actuator. The switching circuits are coupled to control a gating arrangement to which input signals are applied. Therefore, accidental operation of either actuator cannot thereafter be followed by deliberate actuation of the other. Under certain conditions, concurrent commands may result in transmission of brief voltage spikes through the gating circuits. These voltage spikes are eliminated by virtue of integrating circuits which block signals having less than a selected minimum energy.

Alternatively, a positive indication of the actual actuator position can be insured by constructing the actuator to include sensing coils positioned to sense the differences in the magnetic circuit caused by the different actuator positions. In these specific examples, the existence or the direction of the magnetic flux through a particular portion of the magnetic circuit is used to control the transfer of actuating signals from the input circuits to the actuator to thereby prevent the castastrophic actuation of both simultaneously.

A better understanding of the invention may be had by reference to the following description, taken in conjunction with the accompanying drawings, in which.

Figure 1:
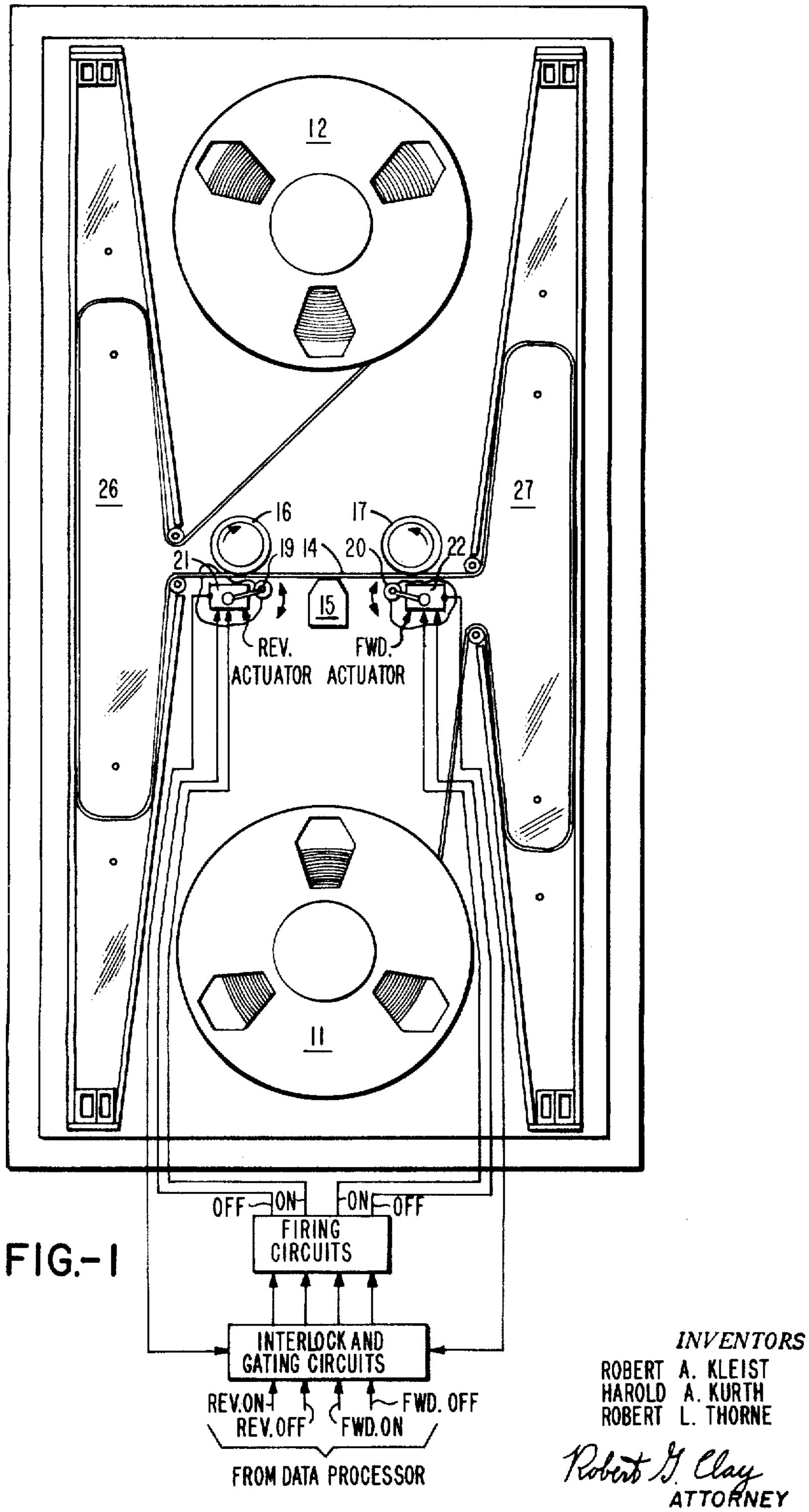
FIGURE 1 is a combined block diagram and partial perspective representation of a system in accordance with the invention utilizing a cooperative arrangement of positive actuator position sensing and gating control circuits.

A typical tape transport system, such as may employ an actuator interlock control system to best advantage, is illustrated in FIGURE 1 as to its general organization. Details of such a system which are not concerned with particular aspects of the present invention have been omitted where possible in order to simplify the description, but their use will be understood by those skilled in the art.

As shown in FIGURE 1, a digital tape transport may operate bidirectionally between a tape supply reel 12 and a tape takeup reel 11, passing a magnetic tape 14 between the two reels and in either direction across a magnetic head assembly 15, which is substantially symmetrically placed relative to the reels. A pair of oppositely rotating capstans 16 and 17 are used to drive the tape 14 in either direction, as determined by the program of an external data processing system or device to which the tape transport is coupled. Pinch rollers 19 and 20 disposed on the opposite side of the tape 14 from each of the capstans 16 and 17, respectively, are urged with minimum delay against the capstan surface by action of the respective actuator 21 or 22. Either actuator shaft is rotated to raise the attached connecting arm, thereby urging the tape against the capstan 16 or 17 and moving the tape 14 in the selected direction. The sudden start and stop movements of the tape 14 act only against low inertia lengths of the storage loop provided by a vacuum chamber 26 or 27 disposed between each of the rotating capstans 16 and 17 and the associated reels 12 and 11. Other forms of low inertia compliance means, such as multiple loop tension arms (not shown) may be employed separately or in conjunction with the vacuum chambers 26 and 27 in order to permit the high speed changes of tape movement at the head assembly 15 without requiring a comparable movement at the reels 11 and 12.

The actuator system for each pinch roller is normally in the form of a bistable magnetic device having a pair of different magnetic flux paths which are completed in accordance with the position of a central, movable actuator armature or vane. "On" and "off" signals are applied to each of the actuators, to place or maintain the actuator in a selected stable position in which it is held magnetically. Each of the actuators, in accordance with the present invention, and as set out in greater detail below in conjunction with FIGURE 2, includes an additional electrical circuit coupled into the alternative magnetic circuits and providing a positive indication of the position of the actuator vane and therefore of the pinch roller, without disturbing the bistable operation of the actuator. The signals or other indications provided thereby are applied to control the outputs from gating control circuits, to which input commands may be provided in any sequence and which, in conjunction with the actuators receiving the outputs, operate correctly despite accidental engagement of one of the actuators in the "on" position.

Details of construction of an actuator element in accordance with the invention are similar in certain general respects to actuators which are known in the art, and which are arranged to provide the desired bistable magnetic characteristics. That is, the general structure provides an approximate loop configuration, in the form of an O with the sides 31 and 32 of the O being of magnetic material and each having inwardly protruding, facing pole tip pairs 34, 35 and 36, 37. The top and bottom portions of the closed O are provided by a pair of permanent magnets 41 and 42 having identical polarity dispositions. A central rotatable actuator vane 43, carried by or forming a part of the rotatable actuator shaft so as to position the associated pinch roller through movement of its connecting arm, is mounted centrally within the actuator. The actuator vane 43 can assume either of two diagonal positions in which it engages the diagonally opposed pole tip pairs 34, 37 and 35, 36 extending from the opposite side elements. The actuator vane 43 provides a low reluctance, shunt magnetic path between the opposite sides of the actuator structure, and thus completes and maintains a closed magnetic flux path until again positively actuated to the opposite stable position. The actuation is effected by actuating windings 44 and 45 receiving "on" or "off" energizing signals from the external source, and establishing an appropriate flux in the vane 43 to cause repulsion to one diagonal position and attraction to the other.

In accordance with the present invention, the pole tips of the diagonally opposed set 34, 37 which define the "off" position of the actuator are electrically insulated from the remainder of the magnetic structure. Thin electrical insulator elements 48 and 49 separate the extremity of each of the two pole tips 34 and 37 from their bases, but do not introduce sufficient air gap to materially affect the magnetic circuit. The actuator vane 43 itself is electrically grounded, and the extreme surface of each pole tip which is engaged by the actuator vane when it is in the "off" position includes an insulated conductive element 53 or 54 which extends through the pole tip and the magnetic structure to an external terminal on the face of the pole tips 34 and 37.

When the actuator vane is in the "off" position, therefore, the actuator couples these two conductive elements 53 and 54 to electrical ground, so that the actuator vane 43 constitutes the movable switching element for a switching circuit. Both conductive elements 53 and 54 are electrically connected in parallel to ground in this manner, in order to provide a redundant reading of the actuator position and to insure reliability despite dust or other impurities, or wear of the contact surfaces. Further redundancy could be added in the form of insulated pole tips and comparable conductive elements for the "on" position, but such duplication has been found to be unnecessary for most practical installations.

Figures 2, 4:
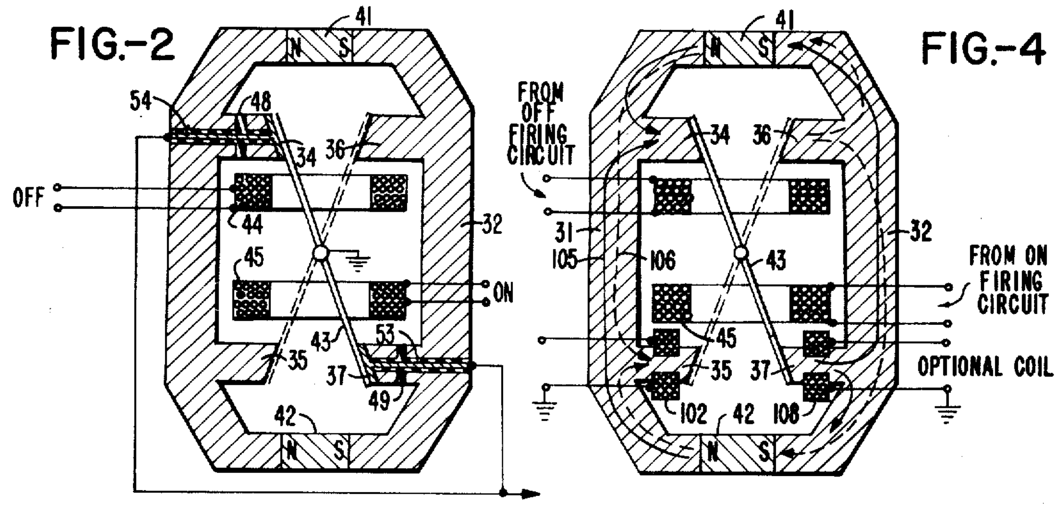
FIGURE 2 is an enlarged sectional view of a positive actuator sensing system which may be utilized in the arrangement of FIGURE 1.
FIGURE 4 is an enlarged sectional view of a positive actuator sensing system according to the invention.
Figure 3:
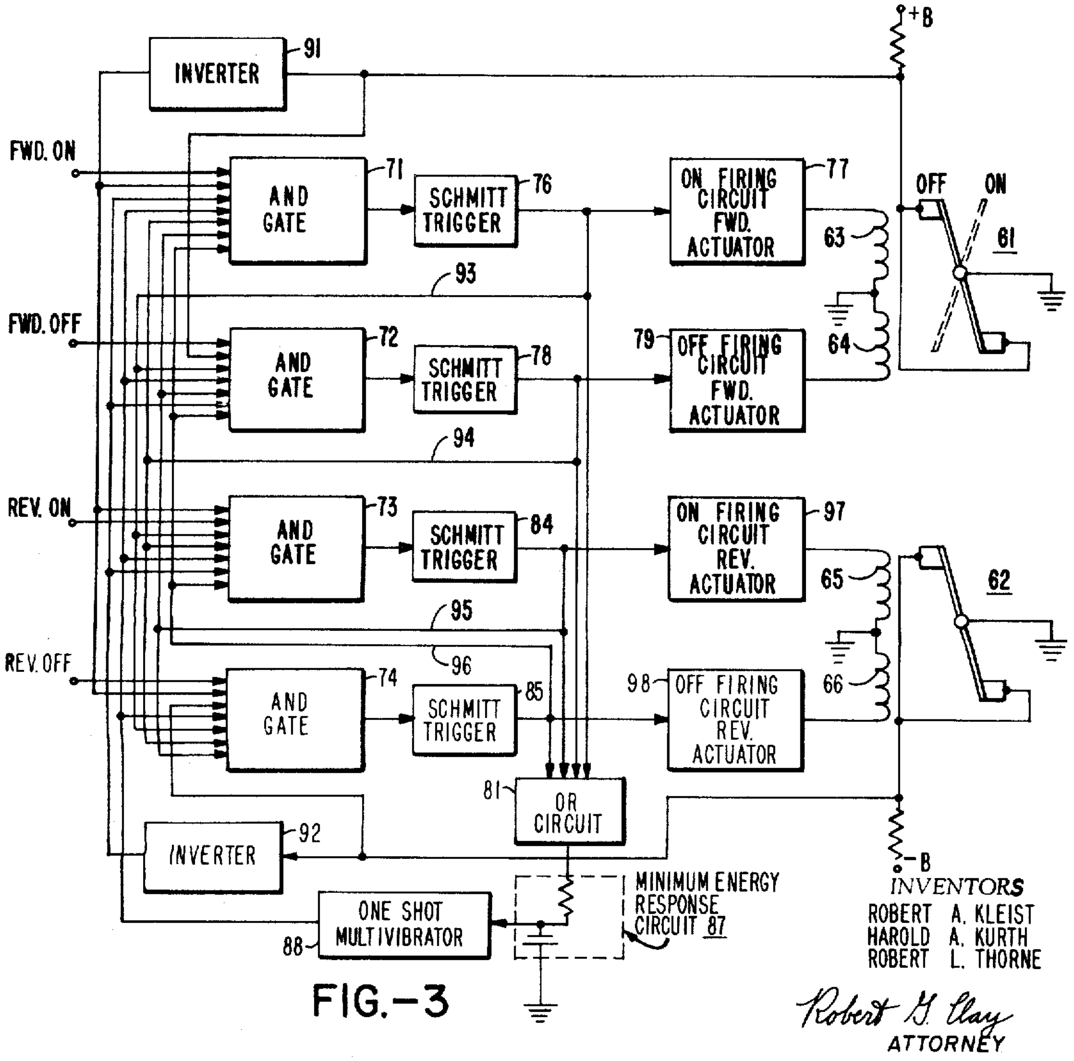
FIGURE 3 is a block diagram of gating control circuits, including a minimum energy response circuit, which may be used in the arrangement of FIGURE 1.

The positive actuator position indication signals which are provided by the arrangement of FIGURE 2 are supplied as control signals to the gating control circuits which are illustrated in more detail in FIGURE 3. Remote control signals, designated respectively forward "on," forward "off," reverse "on," and reverse "off" constitute the remaining external signals for controling the forward and reverse actuators 61 and 62 of this system. This gating control system also, however, performs a number of other functions which serve to eliminate application of conflicting signals to the actuators, actuation in response to erroneous signals, and actuation without the provision of adequate delay between successive commands.

The energizing windings 63, 64 and 65, 66 for the separate actuators 61 and 62 are shown in simplified schematic form, as are the forward and reverse actuators themselves. The positive signal indications derived from the "off" position of each actuator constitute additional signals for this circuit.

The necessary logical relationships are established by a set of four "AND" gates 71–74 which are coupled to receive the input commands as well as the positive indication signals from the actuators, either in non-inverted or in inverted form. Like logical relationships are observed with respect to both the forward and reverse sides, and so only the "AND" gates and associated circuits for the forward side will be described in full detail, it being understood that the same description applies to the circuits used in conjunction with reverse actuation.

One "AND" gate 71 controls a first Schmitt trigger circuit 76 which is coupled to a firing circuit 77 for the "on" state of the forward actuator. Another "AND" gate 72 is similarly coupled through a second Schmitt trigger circuit 78 to the "off" firing circuit 79 for the forward actuator 61. The output signals from both Schmitt triggers 76 and 78 are applied to an "OR" gate 81 which receives similar output signals from the other two Schmitt triggers 84 and 85 in the reverse control circuitry of the system. The output signal from the "OR" gate is applied to a minimum energy response circuit 87, which selects voltage impulses only if they are in excess of a predetermined energy level. Output signals passing the minimum energy response circuit 87 trigger a one-shot multivibrator 88 which provides a negative-going output upon firing (assuming for the purposes of the present examples that all of the "AND" gates 71 to 74 require high level positive enabling inputs). The one-shot multivibrator 88 produces an approximately 2-millisecond negative output pulse, in the present example, thereby disabling all of the "AND" gates 71 to 74 once it is fired.

The forward "on" signal is provided as an input signal to the first "AND" gate 71 and the forward "off" signal is provided to the second "AND" gate 72. The remaining input signals to each "AND" gate are derived by interconnections from the various Schmitt triggers 76, 78, 84 and 85 and from the positive actuator indication signals, both non-inverted and inverted. In each case, the non-inverted signal indicating the "off" state is coupled without inversion to the "AND" gate 72 or 74 which is used to control generation of the "off" command to the respective actuator 61 or 62. Because this constitutes a grounding of that input terminal, the respective "AND" gate 72 or 74 is disabled. Concurrently, by derivation of the inverted indication signal through an inverter circuit 91, the first "AND" gate 71 is enabled at the corresponding input terminal. This interconnection therefore provides that, if the forward actuator 61 is in the "off" position, the coupled "AND" gate 72 is disabled and an "off" command cannot be applied, whereas an "on" command can be applied through "AND" gate 71 unless other disabling conditions are present. The forward and reverse parts of the circuit are also cross-coupled by the application from the inverter 92 of the inverted signal of the positive signal indication of the "off" state at the reverse side, for example, to all of the "AND" gates 71, 72, and 73 except that "AND" gate 74 which is in the circuit with the "off" firing for the reverse actuator 62.

The output signal from each Schmitt trigger 76, 78, 84, and 85 is also coupled via the connectors 93, 94, 95 and 96, respectively, to control enabling of the "AND" gates 71–74 which receive each of the three possible other commands. These Schmitt trigger circuits have the property of producing an output pulse of constant peak amplitude for the entire period of time that the input signal exceeds a specific voltage. In accordance with the previous assumptions, the Schmitt triggers of the present example produce a normally high level positive output except during the time an input is being received from the respective "AND" gates at which time a negative-going pulse of constant level is produced. Accordingly, the "OR" circuit 81 is made responsive to negative-going pulses, and the one-shot multivibrator 88 responds to the passage of these negative pulses. Accordingly, each of the "AND" gates 71 to 74 has seven input terminals (all of which must receive positive enabling inputs), one of which is derived directly from an external command, a second of which is derived from the position of the associated actuator 61 or 62, either in non-inverted or inverted form, a third of which is derived from the position of the opposite actuator 62 or 61, respectively, a fourth of which is derived from the actuation of the one-shot multivibrator 88, and the remaining three of which are derived from the outputs of the other three command signal channels.

This intercoupling therefore assures an interlocking of the system and freedom from erroneous operation when simultaneous input commands are applied, when commands closer than the actuator cycle time (2 milliseconds after actuation of the multivibrator 88) are applied, and when commands are applied which represent an illogical sequence (e.g., the provision of a forward "on" signal when the reverse actuator 62 is already "on"). If both actuators 61 and 62 are in the "off" position, either a forward "on" or a reverse "on" command may be accepted. On the other hand, either "off" command would be blocked by the respective "AND" gate 72 or 74. A negative-going Schmitt trigger circuit output pulse, once provided, immediately inhibits all other commands at the other three "AND" gates. Therefore, upon application of simultaneous command signals, the Schmitt trigger circuit firing first acts within approximately 1 microsecond to stop or prevent the firing of the other Schmitt trigger circuit until the one-shot multivibrator 88 is actuated. In effect, this combination of "AND" gates and Schmitt triggers thereby forms an "exclusive OR" circuit which prevents acceptance of simultaneous input commands.

The use of the one-shot multivibrator 88 which provides a 2-millisecond interval, immediately inhibits all inputs for the 2-millisecond interval following its actuation by a signal of sufficient energy. If, for example, both actuators 61 and 62 are "off" and a forward "on" command is provided, then the other commands are inhibited for the 2-millisecond interval by concurrent disabling of the "AND" gates 71 to 74. The disabling of the "AND" gate 71 then resets the Schmitt trigger 76 thereby terminating a signal which triggers the firing circuit 77 for the forward "on" actuator. The "AND" gates 71 to 74 remain disabled by the low level pulse until after the 2-millisecond interval, following which the interlock relationships are again established by the actuator positions. This interval is the time needed to insure that the actuator cycle has been completed and the tape has been fully stopped or started by the previous command before a new one is applied.

The minimum energy response circuit 87 requires a pulse of 12 volts, applied for a minimum of 5 microseconds before the one-shot multivibrator 88 will be fired. This circuit is used to eliminate narrow pulses of less than about 1 microsecond in duration which, although not of sufficient duration to fire the firing circuits, can appear at the output of the Schmitt triggers upon application of simultaneous input commands. Such simultaneous input commands accordingly do not adversely affect the actuation of the one-shot multivibrator 88.

As soon as a pulse of proper amplitude and duration is provided to the one-shot multivibrator 88 through the minimum energy response circuit 87 and the appropriate firing circuit fires all the "AND" gates are immediately disabled by the output from the multivibrator 88.

The actuator, in accordance with the present invention, can be constructed by omitting the electrical contacts and including instead windings upon the actuator structure to sense the direction or strength of the flux in the bistable magnetic paths. Certain simplifications can then be made in the gating circuitry, as will later be described.

It is also feasible to connect a distributor structure to the actuator shaft and dispose spaced contact elements within or without the actuator. While this provides a relatively simple structure it does not provide definite registration with the actuator position. Further, considerable force may have to be overcome if adequate contact pressure is provided.

Referring now to FIGURE 4, an actuator is shown which retains the same basic features of the actuator shown in FIGURE 2 except for the elimination of the conductors and insulators within the two pole tips 34 and 37. Instead, a sensing coil 102 is disposed in an annular recess around the pole tip 35 for sensing the flux density in the pole tip material. The annular recess provides a smaller cross-sectional area of magnetic material under the sensing coil 102 thereby assuring a greater flux density than in the remainder of the pole tip 35.

The bistable magnetic flux paths produced within the actuator structure by the position of the vane 43 are herein illustrated by magnetic path tracings, the solid tracing 105 representing the "off" condition, and the dashed trace 106 representing the "on" condition. With the vane 43 in the "off" position, the magnetic flux path is established through the pole tip 34, whereas the pole tip 35 under the sensing coil 102 has little if any flux and thus high permeability. On the other hand, with the vane 43 in the "on" position, the magnetic path is switched through the pole tip 35, and a relatively low permeability results in the magnetic material under the sensing coil 102. In order to provide circuit redundancy to insure reliability, an optional sensing coil 108 may be added to the opposite pole tip 37 to sense the magnetic permeability, but such duplication is not often necessary for most practical installations since most redundancy problems such as encountered in the closing of electrical contacts are avoided.

Figures 5, 7, 8:
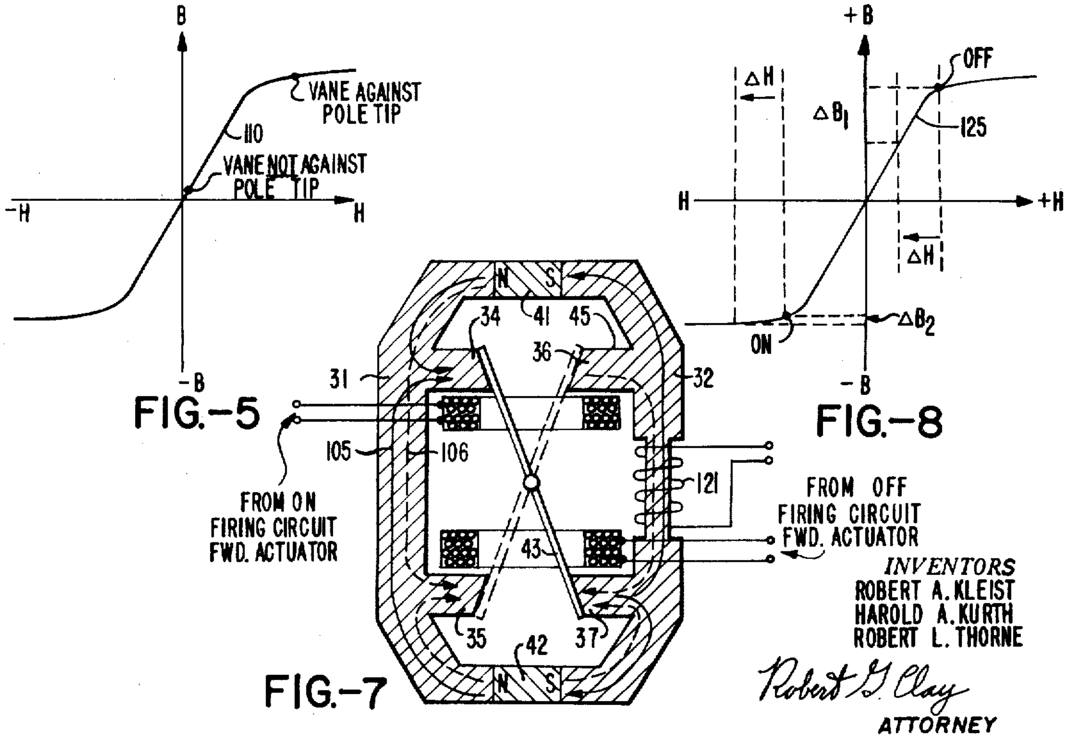
FIGURE 5 is a graphical illustration of a hysteresis curve for use in explaining the operation of the positive actuator sensing system of FIGURE 4.
FIGURE 7 is an enlarged view in schematic form of an alternative positive actuator sensing system which may be used in the tape transport system, as illustrated in FIGURE 6.
FIGURE 8 is a graphical illustration of a hysteresis loop for explaining the operation of the positive actuator sensing system of FIGURE 7.

The positive indications of actuator position provided by the arrangement of FIGURE 4 need not be supplied to separate gating control circuits since the coils provide an inherent gating function in themselves, as may be seen by reference to FIGURE 5. The two magnetic conditions sensed by the sensing coils 102 and 108 are shown as two positions upon a hysteresis curve 110 for a typical magnetic material. When the vane is not against the respective pole tip on which the coil is located, the coil exhibits a high inductance and high impedance characteristic to applied signals due to the location of the operating point substantially in the center of the unsaturated portion of the hysteresis curve 110. However, with the vane against the pole tip carrying the respective coil, a relatively low inductance and low impedance value is produced by a magnetic field strength of saturation proportions in the restricted cross-sectional area of the pole tip.

Figure 6:
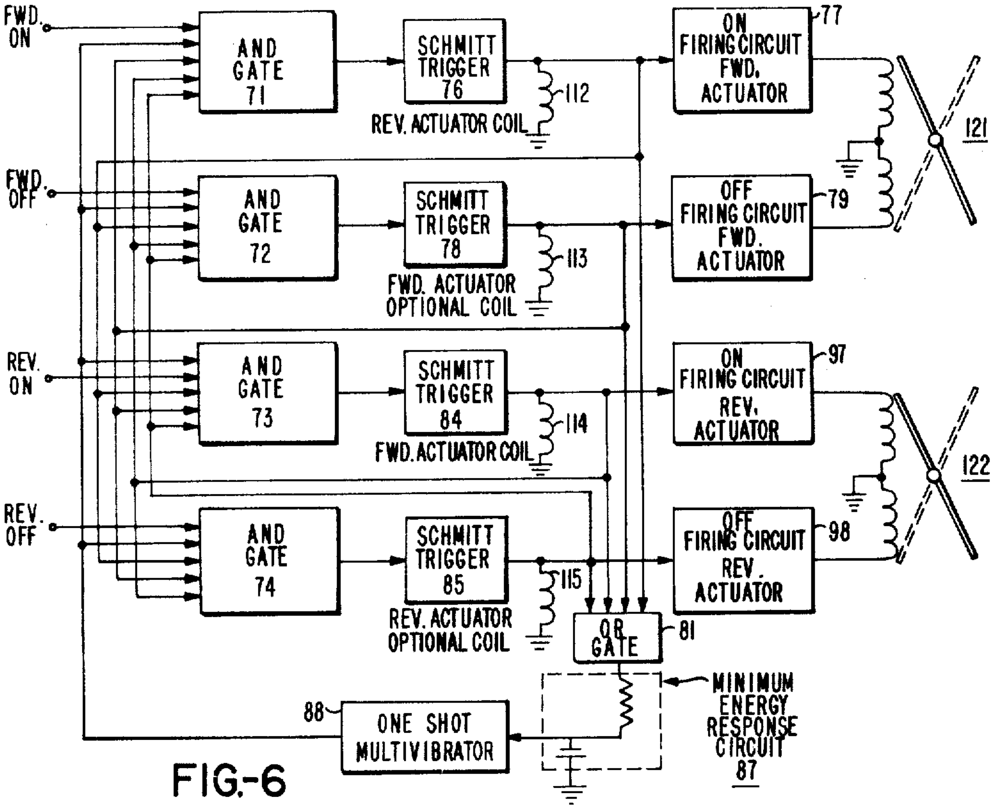
FIGURE 6 is a schematic diagram, partially in block diagram form, of gating and actuating control circuits including positive actuator sensing systems according to FIGURE 4.

By virtue of the high impedance to the passage of a pulse presented by a coil having high inductance and the low impedance by a coil having low inductance, such a coil offers the essential requirements needed for a pulse-gating circuit. In one such circuit, referring now to FIGURE 6, the sensing coils 112 to 115 are coupled at the output of their respective Schmitt triggers as a shunt gating element to ground. Although the other signal inputs to the "AND" gates 71 to 74 remain the same as in FIGURE 3, the two additional gating inputs obtained from the positive indications of actuator position may be eliminated by this arrangement. The sensing coil 112 on the reverse actuator 122 presents a very low impedance to ground whenever the actuator 122 is in the "on" position thereby preventing the passage of a firing signal from the Schmitt trigger 76 to the "on" firing circuit 77 of the forward actuator 122. Grounding of the output from the Schmitt trigger 76 in this manner also prevents a pulse of sufficiently high energy from actuating the one-shot multivibrator 88 to inhibit all "AND" gates 71 to 74. On the other hand, with the reverse actuator 122 in the "off" position, pulses from the Schmitt trigger 76 are passed by the high inductance sensing coil 112 to the "on" firing circuit 77 of the forward actuator 121. The sensing coil 114 likewise prevents actuation of the "on" firing circuit 97 for the reverse actuator 122 whenever the forward actuator 121 is already in the "on" position.

The optional coils 113 and 115 operate in a similar manner to prevent pulses from the Schmitt triggers 78 and 85 from firing the "off" firing circuits 79 and 98 when the respective actuators 121 and 122 are already in the "off" position. Therefore, by use of the sensing coils 112 to 115, the identical gating functions are obtained to control the actuators 121 and 122, but without the necessity of inverter circuits and the two additional inputs to the "AND" gates 71 to 74.

Alternatively, referring now to FIGURE 7, a sensing coil 121 may be utilized in a similar fashion to produce a positive indication of the actuator position by sensing the direction of the flux field in a restricted portion of one side 32 of the actuator construction. As seen from the illustrative flux path traces 105 and 106, the direction of the flux through that portion of the side 32 between the pole tips 36 and 37 reverses direction with a change in the position of the vane 43. The manner in which this change may be utilized to perform the gating functions is illustrated in FIGURE 8 on the hysteresis curve 125. The magnetic field produced through the restricted portion under the coil 121 is approximately that needed to place both the "on" and "off" operating points at the knee of the saturation curve. A pulse obtained from one of the Schmitt triggers is always in the same direction thereby producing a magnetic force $\Delta H$ in the negative direction, according to this example. When the actuator is in the "off" condition, the magnetizing force $\Delta H$ is located on the hysteresis curve 125 in the region of non-saturation causing a large flux change $\Delta B_1$ and thereby presenting a high inductance value. However, with the actuator in the "on" condition, the magnetizing force $\Delta H$ produced by a pulse from the Schmitt trigger only moves along the saturated portion of the curve in the negative direction to produce a relatively small flux change $\Delta B_2$ in the magnetic material under the coil 121 thereby exhibiting low inductance and low impedance characteristics. For purposes of redundancy, another sensing coil may be placed in a similar position but oppositely wound around the opposite side 31 of the actuator.

It would also be possible to use either of the sensing coils described to provide electrical signals to be supplied to the inputs of the "AND" gates 71 to 74 in the same manner that the electrical indications of actuator positions are connected in FIGURE 3. Conversely, the electrical indications obtained may be used to actuate additional gating elements placed between the Schmitt triggers and the firing circuits instead of supplying them as inputs to the "AND" gates 71 to 74. As a practical matter, however, electrical indications are best applied as additional inputs to the "AND" gates while the sensing coils are best used as gating elements between the Schmitt triggers and their associated firing circuits as illustrated.

While there have been described above, and illustrated in the drawings, various forms of interlock control circuits for digital tape transports, it will be appreciated that a number of other alternatives may be employed. Accordingly, the invention should be considered to include all modifications and variations falling within the scope of the appended claims.

What is claimed is:

1. A positive actuator interlock for magnetic tape systems having a pair of opposite driving elements subject to concurrent or erroneous actuation by application of command signals, comprising a pair of actuator means each having a movable actuator element which element is magnetically and electrically conductive and each actuator having a pair of different magnetic flux paths which are completed by said element in accordance with the operating position of said element, electrical circuit means coupled with at least one of the flux paths of each of the actuator means for completing different electrical circuits dependent upon the operating positions of the actuator elements and providing control signals indicative of the position of said element, and gating means receiving and responsive to remote command signals and said control signals, the gating means controlling the application of said command signals in accordance with the nature of said control signals.

2. A positive actuator interlock for magnetic tape systems having a pair of opposite driving elements subject to concurrent actuation by command signals, comprising a pair of bistable magnetic acuator elements having a movable actuator vane within a closed magnetic structure having diagonally opposed pole pieces, said vane being magnetically and electrically conductive, the magnetic structure including permanent magnet means with the vane contacting diagonally opposed pole pieces in each of two stable positions, electrical circuit means coupled with the pole pieces within the flux paths for completing at least one electrical circuit dependent upon the actuator vane position for each actuator and providing control signals indicative of the position of said vane, and gating means receiving and responsive to remote actuator command signals and said control signals for controlling the application of said command signals in accordance with the nature of said control signals.

3. A positive actuator interlock for magnetic tape systems having a pair of opposite driving elements subject to concurrent or erroneous actuation, comprising a pair of actuator means each having a pair of alternative open magnetic flux paths and a movable actuator element, said element providing a low reluctance shunt for a selected one of said paths dependent upon the operating position of said actuator element, sensing means disposed along at least one of the flux paths of each of the actuator means for sensing the flux density of said path and the operating position of the actuator element said sensing means providing control signals in accordance with the position sensed, and gating means receiving and responsive to remote command signals and said control signals for controlling the application of said command signals in accordance with the nature of said control signals.

4. A positive actuator interlock for magnetic tape systems having a pair of opposite driving elements subject to concurrent or erroneous actuation by application of command signals, comprising a pair of actuator means each having a pair of alternative open magnetic flux paths and a movable actuator element, said element providing a low reluctance shunt for a selected one of said paths, dependent upon the operating position of said movable actuator element, circuit means responsive to received control signals and adapted for controlling the application of remote command signals to the actuator means in accordance with the control signals, and sensing means disposed along at least one of the flux paths of each of the actuator means for sensing the flux density of said path and producing electrical control signals according to the flux density, said sensing means being coupled to said circuit means to apply the control signals for controlling the application of said command signals to each of the actuator means in accordance with the positions of the movable actuator elements.

5. A bistable magnetic actuator element for actuating the driving elements of a magnetic tape system comprising a closed magnetic structure providing an approximate loop configuration and having diagonally opposed inward protruding pairs of pole pieces, magnetic means for maintaining the diagonally opposed pole pieces at different magnetic polarities, a movable actuator vane pivotally mounted within the closed magnetic structure for simultaneously contacting a pair of said diagonally opposed pole pieces to complete different magnetic flux paths, and means disposed along at least one of the flux paths for sensing the flux density of said path and producing an electrical signal indicative of the position of the vane in accordance with the flux sensed within that path.

6. A bistable magnetic actuator element for actuating the driving elements of magnetic tape systems comprising a closed magnetic structure providing an approximate loop configuration and having diagonally opposed inward protruding pole piece pairs, the magnetic structure including magnetic means for maintaining the diagonally opposed pole pieces at opposite magnetic polarities, a movable actuator vane pivotally mounted within the closed magnetic structure for contacting different pairs of the diagonally opposed pole pieces to complete different flux paths, means including electrical circuit means disposed along the pole pieces within the flux paths for completing at least one electrical circuit dependent upon the movable vane position in accordance with the flux within that flux path, whereby a positive indication of the vane position is obtained.

7. A bistable magnetic actuator element for actuating the driving element of a magnetic tape system comprising a closed magnetic structure providing an approximate loop configuration and having diagonally opposed inward protruding pairs of pole pieces, a magnetic means for maintaining the diagonally opposed pole pieces at different magnetic polarities, a movable magnetic vane pivotally mounted within the closed magnetic structure for contacting the different magnetic pole piece pairs and completing different flux paths, means including a flux sensing coil disposed on one of said pole pieces along one of the flux paths for sensing the magnetic permeability of the pole piece and producing an electrical signal indicative of the movable vane position in accordance with that permeability.

8. A bistable magnetic actuator element for actuating the driving elements of magnetic tape systems comprising a closed magnetic structure providing an approximate loop configuration and having diagonally opposed inward protruding pairs of pole pieces, magnetic means for maintaining the diagonally opposed pole pieces at different magnetic polarities, a movable vane for contacting different pairs of the diagonally opposed pole pieces to complete different magnetic flux paths, and sensing means including a flux sensing coil disposed on the magnetic structure between adjacent pole pieces for sensing the flux path established by the position of the movable vane, said sensing means producing an electrical signal indicative of said vane position.

9. A bistable magnetic actuator element comprising a closed magnetic structure providing an approximate loop configuration, a movable actuator element within said loop for establishing different flux paths within the magnetic structure, and circuit means disposed along at least one of the flux paths for sensing the flux path established by the position of the movable actuator element whereby a positive indication of the position of the movable actuator element may be determined.

10. A bistable magnetic actuator element comprising a closed magnetic structure providing an approximate loop configuration and including two pairs of diagonally opposed pole pieces protruding within said loop, a rotatable actuator vane for contacting either of said pairs of diagonally opposed pole pieces, permanent magnetic means included within the closed magnetic structure for maintaining the opposed pole pieces at different magnetic polarities, and circuit means disposed upon the magnetic structure for sensing the flux path established by contact of the actuator vane with one of the pairs of diagonally opposed pole pieces to close the magnetic path between the different polarities.

11. A system to prevent erroneous dual actuation of two members each having "OFF" and "ON" states including circuit means for positively sensing the actual state of each member, gating means receiving and responsive to command signals and the sensing means for controlling the application of actuation signals to the members in accordance with the command signals and the existing state of each member, and means including a timing circuit connected to apply inhibiting signals to the gating means for selectively disabling each of the gating means for selected periods after receipt of an actuation signal of sufficient energy to change the state of the members.

12. A positive actuator interlocking system for a magnetic tape system having a pair of opposite drive elements subject to concurrent or erroneous actuation by application of command signals, comprising separate gating means for receiving each of said command signals and for passing said command signals to actuate the respective driving elements only in the absence of an inhibiting signal, first means connected to the output of each of the gating means for applying a first inhibiting signal to the other gating means during such time that a command signal is being applied to one of the actuator means, timing means connected to the output of each of the gating means and responsive to the application of a command signal to the respective driving element, the timing means applying a second inhibiting signal to all the gate means for a predetermined period after application of a command signal, and sensing means coupled to said actuator means for applying selective inhibiting signals to the separate gating means in accordance with the actual state of the actuator means.

13. The positive actuator interlocking system of claim 12 in which said timing means includes a minimum energy response circuit responsive only to the application of signals above a predetermined minimum energy level approximating the energy level of an applied command signal, whereby only actual command signals are applied to said actuator means.

14. A positive actuator interlocking system for magnetic tape systems having a pair of opposite driving elements subject to concurrent or erroneous actuation by the application of command signals, comprising separate gating means for receiving each of the different command signals, means connected to the output of each of the gating means for disabling each of the other gating means upon application of a correct command signal to one of the actuator means, timing means for disabling all of the gating means for a predetermined period after application of a command signal, and circuit means coupled to each of the actuator means for selectively preventing the application of erroneous command signals in accordance with the actual position of the actuator means.

15. A positive actuator interlocking system for a magnetic tape system having a pair of opposite drive elements subject to concurrent or erroneous actuation by application of command signals, comprising separate gating means for receiving each of the different command signals, a pair of actuator means for separately actuating each of the driving elements, means connected to the output of each gating means for disabling each of the other gating means upon application of a correct command signal to one of the actuator means, timing means for disabling all of the gating means for a predetermined period after application of a command signal, and circuit means coupled to each of the actuator means for selectively preventing application of erroneous command signals in accordance with the actual position of the actuator means, said actuator means having different magnetic flux paths dependent upon the operating position of an actuator element, and said circuit means including means disposed along at least one of the flux paths of each of the actuator means for sensing the operating position of the actuator element.

16. A positive actuator interlocking system for a magnetic tape system having a pair of opposite driving elements subject to concurrent or erroneous actuation by the application of command signals, comprising separate gating means for receiving each of the different command signals, means connected to the output of each of the gating means for disabling each of the other gating means upon application of a correct command signal to one of the actuator means, timing means for disabling all of the gating means for a predetermined period after application of a command signal, and a positive actuator interlock means including a pair of actuator means having magnetic flux paths dependent upon the operating position of an actuator element, and sensing means disposed along at least one of the flux paths for sensing the flux density and producing control signals indicative of the position of the actuator element, which control signals are coupled to selected ones of the gating means for selectively preventing the application of erroneous command signals in accordance with the actual position of the actuator means.

References Cited

UNITED STATES PATENTS

| | | | |
|---|---|---|---|
| 2,881,365 | 4/1959 | Bernstein | 200—93.31 |
| 3,001,049 | 9/1961 | Didier | 200—93.31 |
| 3,100,889 | 8/1963 | Cannon | 340—259 |

THOMAS B. HABECKER, *Acting Primary Examiner.*

NEIL C. READ, *Examiner.*

D. J. YUSKO, *Assistant Examiner.*